United States Patent Office 3,553,239
Patented Jan. 5, 1971

3,553,239
SEPARATION METHOD
Ted B. Haufe, Western Springs, and Kenneth D. Uitti, Bensenville, Ill., assignors to Universal Oil Products Company, Des Plaines, Ill., a corporation of Delaware
No Drawing. Continuation-in-part of application Ser. No. 602,154, Dec. 16, 1966. This application Sept. 11, 1968, Ser. No. 759,228
Int. Cl. C11b 1/10
U.S. Cl. 260—412.8     8 Claims

ABSTRACT OF THE DISCLOSURE

Method for producing an edible oil, such as soya bean oil, by contacting soya beans with a specific solvent obtained from a petroleum processing step for the production of gasoline boiling range products, such as benzene.

RELATED APPLICATION

This application is a continuation-in-part of application Ser. No. 602,154, filed Dec. 16, 1966, now U.S. Pat. No. 3,457,166 issued July 22, 1969

BACKGROUND OF THE INVENTION

This invention relates to a separation method. It also relates to a method for separating aromatic hydrocarbons from non-aromatic hydrocarbons. It particularly relates to a method for producing a solvent from a contaminated raffinate stream which is useful for extracting edible oils. It specifically relates to a process for producing an edible oil by contacting vegetables with a specific type of solvent.

The use of solvent extraction for the separation of aromatic hydrocarbons, e.g. benzene, toluene, xylenes, from non-aromatic hydrocarbons is generally well known in the art. In such a process, a solvent selective for aromatic hydrocarbons is contacted with a hydrocarbon feed mixture, such as catalytic reformate, containing both aromatic and non-aromatic hydrocarbons in a suitable contactor for effectuating intimate contact between the hydrocarbon phases and the selective solvent. A raffinate stream is removed from one end of the extractor and comprises generally non-aromatic hydrocarbons contaminated with solvent and a small quantity of the aromatic hydrocarbons. In similar fashion, the extract is removed from the contactor and contains the major proportion of the solvent having the aromatic hydrocarbons dissolved therein. The raffinate phase is then washed with a suitable second solvent such as water to remove the primary solvent for recovery and recycle to the process. The raffinate phase, which is contaminated with aromatic hydrocarbons and an extremely minor amount of solvent, leaves the process for further handling and/or use, typically, as a gasoline blending component. The extract phase is processed through a series of distillation columns wherein the solvent is removed from the aromatic hydrocarbons for recycle and reuse in the process, with the aromatic hydrocarbons being recovered as a distillate fraction in very high purity and high yield.

It is also well known in the art that the nonaromatic hydrocarbon raffinate which leaves the extraction zone contains a significant quantity of primary solvent as well as aromatic hydrocarbon. This solvent must be recovered not only because it may interfere with subsequent raffinate processing or ultimate raffinate use, but primarily because continual loss of solvent in the raffinate stream is a prohibitive economic expense.

The production of essential oils and edible oils in the food processing industry utilizes, in similar fashion, a solvent extraction process for the recovery of the oil from the vegetable or fruit utilized as the feed stock. For example, soya bean oil is recovered from soya beans by extracting the oil from the previously crushed beans using a selective solvent such as high purity hexane.

It is important of course that the solvent used to recover the edible oil or essential oil be of utmost purity since a small proportion of the solvent used to recover the oil becomes a contaminant in the edible oil and ultimately is consumed by human beings. In recent times it has been found that the presence of small quantities of aromatic hydrocarbons is deleterious to the health of humans. Therefore, it is desirable to purify the solvent used to extract the edible oils to such an extent that the aromatic content and solvent (etc.) content thereof is at an extremely low level.

SUMMARY OF THE INVENTION

Accordingly, it is an object of this invention to provide a separation method.

It is also an object of this invention to provide an improved method for separating aromatic hydrocarbons from non-aromatic hydrocarbons.

It is a particular object of this invention to provide a method for separating aromatic and non-aromatic hydrocarbons in such a way that the raffinate removed from the process is of such purity that it can be used in the edible oil industry.

It is a specific object to produce an edible oil from vegetables in a facile and economical manner.

These objects and other advantages of this invention will be more fully understood from the detailed description presented hereinbelow.

Therefore, in accordance with this invention, there is provided a process for producing an edible oil which comprises contacting non-aromatic hydrocarbons contaminated with aromatic-hydrocarbon-selective solvent and aromatic hydrocarbons with a solid adsorbent under conditions sufficient to remove contaminants therefrom, recovering nonaromatic hydrocarbons substantially free from contaminants, introducing crushed vegetables into an extraction zone, contacting said crushed vegetables with said contaminant-free non-aromatic hydrocarbons, and recovering edible oil of said vegetable from said extraction zone.

A specific embodiment of this invention comprises the use of sulfolane as the hydrocarbon solvent.

Another specific embodiment of this invention utilizes activated charcoal as the adsorbent in the adsorption zone for the removal of the solvent from the non-aromatic hydrocarbons.

Another specific embodiment of this invention provides a method for producing an edible oil solvent which comprises contacting non-aromatic hydrocarbons contaminated with sulfolane and aromatic hydrocarbons with a solid adsorbent under conditions sufficient to remove contaminants therefrom and recovering non-aromatic hydrocarbons suitable for use as an edible oil solvent.

A particular embodiment of the present invention provides a process for producing an edible oil which comprises: (a) contacting a raffinate stream from a hydrocarbon solvent extraction step, said reaffinate comprising non-aromatic hydrocarbons contaminated with hydrocarbon solvent and aromatic hydrocarbons, with water in a conditioning zone maintained under conditions sufficient to reduce the solvent content of the raffinate stream to less than 500 p.p.m.; (b) passing said conditioned raffinate stream into an adsorption zone in contact with molecular sieve adsorbent under conditions sufficient to remove solvent and aromatic hydrocarbons from non-aromatic hydrocarbons; (c) withdrawing from said adsorption zone a non-aromatic hydrocarbon product substantially free of solvent and aromatic hydrocarbons; (d) contacting crushed vegetables with said non-aromatic product under conditions sufficient to extract edible oil from said vegetable; and, (e) recovering said edible oil.

It is noted from the embodiments of the invention presented hereinabove that the present invention is particularly adaptable to the purification of a typical solvent such as sulfolane which has been used for the recovery of aromatic hydrocarbons from non-aromatic hydrocarbons. The sulfolane-type solvent possesses a five membered ring containing - atom of sulfur and 4 atoms of carbon with 2 oxygen atoms bonded to the sulfur atom of the ring. Generically the sulfolane-type solvents may be indicated as having the following structural formula:

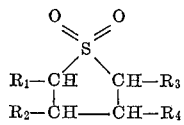

wherein $R_1$, $R_2$, $R_3$, and $R_4$ are independently selected from a group comprising hydrogen, an alkyl group having from 1 to 10 carbon atoms, an alkoxy radical having from 1 to 8 carbon atoms, and an arylalkyl radical having from 1 to 12 carbon atoms. Other solvents which may be included within this process are the sulfolenes such as 2-sulfolene or 3-sulfolene. Still further, other typical solvents which may be removed by the practice of this invention from the raffinate phase inclues 2-methyl sulfolane, 2-4 dimethylsulfolane, methyl 2-sulfonyl ether, various polyethylene glycols, dipropylene glycol, various polypropylene glycols, dimethylsulfoxide, etc. The specific solvent to which this invention is directed is sulfolane having the following structural formula:

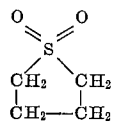

Because the typical solvents which are utilized in aromatic hydrocarbon extraction are water soluble it is the general practice to contact the solvent with an aqueous stream in a subsequent treating step in order to remove entrained or dissolved solvent from the raffinate stream. The extraction of the solvent from the raffinate with water may be undertaken in any suitable liquid-liquid contacting means as in a tower containing suitable packing such as Berl saddles or Raschig rings or in a tower containing suitable trays or in a rotating disk contactor (RDC). The solvent may be readily recovered from the aqueous solution by subsequent distillation. Normally, this water washing step will remove the solvent from the raffinate to the extent that the raffinate leaving the water wash step will contain less than 500 p.p.m. (by weight) of solvent, and, typically, will contain about 100 p.p.m. of solvent.

However, the conventional water wash step has no effect on the aromatic content of the reaffinate which as has been indicated previously is in the order of magnitude from 1 to 3 volume percent of, for example, benzene. In addition, in the food processing industry, a solvent content of as little as 100 p.p.m. solvent is not acceptable and certainly the presence of 1%+ of aromatic hydrocarbons is also not acceptable.

Food processing such as the solvent extraction art for the production of edible oils, such as soya bean oil, cottonseed oil, cocoanut oil, peanut oil, and the like, is well known. For example, in soya bean oil production the soya beans are crushed or otherwise rendered into small particle size and then contacted with a solvent such as hexane for the extraction of the soya bean oil. After the solvent has become saturated with the edible oil it is taken to a stripping column where the oil and solvent are separated. The remaining pulp or cake from the soya bean is taken to a steam distillation step to recover any remaining solvent and is then generally dried and sold for cattle food. The crude edible oils are then further purified or refined by treatment with caustic soda and so forth to remove free fatty acids. The edible oil solvent is subsequently recovered and returned to the process.

It is to be noted that since the edible oil solvent is in contact with the edible oil, a small amount of solvent will contaminate the edible oil. Since the edible oil subsequently comes in contact with or becomes a part of food stuffs, the specifications for the edible oil solvent are rather rigidly controlled. A suitable edible oil solvent which is useful in the extraction of these oils from such vegetables as soya beans generally will contain less than 1% by volume aromatic hydrocarbons, and typically, will contain from 0.05 to 0.5% by volume aromatic hydrocarbons. Similarly, it has been found that an edible oil solvent must contain less than 10 parts per million (p.p.m. by weight) of the solvent such as sulfolane, and preferably, will contain only from 0.1 to 1.0 parts per million of the solvent such as sulfolane. Thus, it is important to treat and purify a raffinate stream in very critical manner before it can be used as an edible oil solvent.

It has been found that the contacting of the raffinate from an aromatic extraction zone with an adsorbent such as activated charcoal, molecular sieves, or diatomaceous earth will remove not only the entrained aromatic hydrocarbons but will also remove any water and solvent which is present in the non-aromatic hydrocarbon phase. It is distinctly preferred in the practice of this invention to use molecular sieves having a pore diameter from about 4 angstroms to about 15 angstroms, with the typical molecular sieve having a pore diameter in excess of 7 angstroms. A commercially available molecular sieve having a pore diameter of 9 angstrom units will be satisfactory in the practice of this invention. The conditions which are used to contact the raffinate phase with the adsorbent include ambient temperatures, e.g., 50° F. to 200° F., preferably 80° F. to 100° F., modest pressure, e.g., atmospheric to 500 p.s.i.g., more preferably 50 to 100 p.s.i.g., and a liquid hourly space velocity of from 0.05 to 2.0, typically, from 0.1 to 0.8. Those skilled in the art using the teachings presented herein will know how to select the proper operating conditions in order to produce a non-aromatic hydrocarbon product containing less than 1% by volume aromatic hydrocarbons and containing less than 10 parts per million of the solvent, e.g., sulfolane.

The contacting of the adsorbent and the raffinate phase may be performed in any manner known to those skilled in the art. The percolation method is preferred wherein the raffinate is passed over a fixed bed of adsorbent in known manner. On the other hand, other means such as the contact method utilizing a slurry of the adsorbent will operate satisfactorily.

As previously mentioned, it is conventional to utilize a water washing step for the raffinate phase subsequent to the solvent extraction step. In the practice of this invention, it is distinctly preferred to retain the water washing step in order to reduce the solvent content to less than 500 p.p.m. In this fashion the amount of adsorbent and the life of the adsorbent may be substantially increased. The regeneration of the adsorbent following the contacting step may also be done by means well known to those skilled in the art. For example, the adsorbed solvent and aromatic hydrocarbons may be removed from the adsorbent utilizing steam purging. For commercial operation, therefore, it is preferred that two fixed beds of adsorbent be utilized in alternating fashion so that during the time one bed is being regenerated the other bed is continuing with the adsorption process. The effluent removed from the adsorbent bed may be passed preferably into the solvent stripping column utilized to remove non-aromatic hydrocarbons from the extract phase of a typical solvent extraction step. By processing the effluent from the adsorption zone in this fashion the aromatic hydrocarbons and the solvent may be subsequently recovered, thereby effecting additional economies in the operation of the solvent extraction process. Those skilled in the art will be familiar with the optimum place for feeding the effluent from the adsorption zone, and such details need not be necessarily presented herein.

Thus, it is seen that the present invention provides a method for producing an edible oil solvent which comprises contacting non-aromatic hydrocarbons contaminated with sulfolane and aromatic hydrocarbons with a solid adsorbent under conditions sufficient to remove contaminants therefrom and recovering non-aromatic hydrocarbons suitable for use as an edible oil solvent. The preferred adsorbent, in the practice of this invention comprises molecular sieves having a pore diameter of at least 7 angstroms (A.). Another satisfactory adsorbent, however, comprises activated charcoal.

The invention will be more fully understood with reference to the following examples wherein Example I consists of a commercial system of the recovery of sulfolane from a raffinate as experienced by the prior art and wherein Example II illustrates the method derived from the practice of the present invention in a preferred embodiment for a commercial scale operation.

EXAMPLE I

A paraffinic raffinate from an aromatic extraction process unit for the production of gasoline boiling range products, e.g. benzene, leaves the extraction section at a rate of 9,525 b.p.s.d. The raffinate comprises hydrocarbon species having from 6 to 8 carbon atoms per molecule, has an average molecular weight of 93.2, and contain small quantities of dissolved sulfolane solvent. This raffinate stream has a gravity of 73.3° API at 60° F. and contains 4.3 mol percent aromatic hydrocarbons. The raffinate leaves the aromatic extraction zone at about 200° F. and contains about 1.2 mol percent of sulfolane solvent in solution. Since the benefits of the present invention are achieved by reducing the solvent content of the raffinate to an extremely small percentage, the example will continue with reference to pounds per hour of material. The raffinate at 200° F. and a rate of 95,860 pounds per hour, comprising 94,470 pounds per hour of hydrocarbons, and 1,390 pounds per hour of sulfolane, is passed into a water wash column after cooling to 100° F. The water wash extractor comprises a roating disk contactor containing, for example, 40 mechanical stages (rotating disks between static annular stators).

The stripping steam condensate from the aromatic extraction process unit enters the RDC column at a rate of 636 barrels per stream day or at an hourly rate of 9,270 pounds per hour. This aqueous stream enters the RDC column at 110° F. and extracts sulfolane solvent from the dispersed raffinate hydrocarbon. The resulting aqueous stream leaves the bottom of the RDC column at about 100° F. and at a rate of 10,646 pounds per hour or 711 barrels per stream day. This effluent stream comprises 9,270 pounds per hour of water and 1,376 pounds per hour of sulfolane solvent and is sent to subsequent distillation means for recovery of the sulfolane solvent. The extracted paraffinic raffinate leaves the top of the water wash column at 105° F. and at a rate of 94,484 pounds per hour or 9,450 barrels per stream day. This conditioned or treated raffinate comprises 94,470 pounds per hour of hydrocarbons and 14 pounds per hour of sulfolane solvent, and has a gr vity of 74.7° API at 60° F. and a molecular weight of 92.9. It is to be noted that the sulfolane content of the raffinate has been substantially reduced, but there is still 14 pounds per hour of sulfolane present in the raffinate phase. In addition, it is to be noted that the water wash column, of course, has had no effect on the aromatic content of the raffinate. Therefore, the scheme used in the prior art produces a raffinate still containing significant quantities of not only the sulfolane solvent, but also of the aromatic hydrocarbons which were originally present in the raffinate phase as it left the solvent extraction zone. Therefore, this raffinate stream, after water washing, is not suitable as an edible oil solvent.

EXAMPLE II

The treated paraffinic raffinate produced in Example I is now passed into a two-bed percolation adsorption zone filled with 8 angstrom molecular sieves. The contacting of this raffinate phase is accomplished at about 100° F. and about atmospheric pressure. The liquid hourly space velocity is less than 1.0 and typically is 0.7. Under these conditions the raffinate leaving the first bed of the adsorption zone now contains less than 10 parts per million of sulfolane and typically contains 0.5 part per million of sulfolane. It also contains less than 1% by volume aromatic hydrocarbons and typically contains 0.1% by volume aromatic hydrocarbons. This raffinate stream, now comprising non-aromatic hydrocarbons substantially free of aromatic hydrocarbons and sulfolane solvent, is suitable for use as an edible oil solvent as previously discussed herein. When the adsorbent in the first bed of the percolation zone has been substantially saturated with the aromatic and solvent molecules the feed is switched to the second zone and steam is introduced into the first bed. The effluent from the first bed during this regeneration step is passed into the solvent recovery column of the aromatic extraction process unit for recovery of the sulfolane solvent and recovery of the benzene from the steam distillation. Considerable economy of operation is achieved by operating the process in this manner.

Similar results are obtained when operating the adsorption zone using activated charcoal.

The invention claimed:
1. Process for producing an edible oil which comprises contacting non-aromatic hydrocarbons contaminated with aromatic hydrocarbon-selective solvent and aromatic hydrocarbons with a solid adsorbent capable of adsorbing said contaminants under conditions sufficient to remove said contaminants therefrom, recovering non-aromatic hydrocarbons substantially free from said contaminats, introducing crushed vegetables into an extraction zone, contacting said crushed vegetables with said contaminant-free non-aromatic hydrocarbons, and recovering edible oil of said vegetable from said extraction zone.

2. Process according to claim 1 wherein said selective solvent comprises sulfolane.

3. Process according to claim 2 wherein said contaminant-free hydrocarbons contain less than 10 p.p.m. selective solvent and less than 1% by volume aromatic hydrocarbons.

4. Method according to claim 1 wherein said adsorbent is selected from the group consisting of activated charcoal and molecular sieves having a pore diameter of at least 7 angstroms.

5. Process for producing an edible oil which comprises:
  (a) contacting a raffinate stream from an aromatic hydrocarbon-selective solvent extraction step, said raffinate comprising non-aromatic hydrocarbons contaminated with a water soluble, aromatic hydrocarbon-selective solvent and aromatic hydrocarbons, with water in a conditioning zone maintained under conditions sufficient to reduce the solvent content of the raffinate stream to less than 500 p.p.m.;
  (b) passing said conditioned raffinate stream into an adsorption zone in contact with molecular sieve adsorbent capable of adsorbing said contaminants under conditions sufficient to remove solvent and aromatic hydrocarbons from non-aromatic hydrocarbons;
  (c) withdrawing from said adsorption zone a nonaromatic hydrocarbon product substantially free of solvent and aromatic hydrocarbons;

(d) contacting crushed vegetables with said non-aromatic product under conditions sufficient to extract edible oil from said vegetable; and, (e) recovering said edible oil.

6. Process according to claim 5 wherein said solvent comprises sulfolane.

7. Process according to claim 6 wherein said non-aromatic hydrocarbon product withdrawn from said adsorption zone contains less than 10 p.p.m. solvent and less than 1% by volume aromatic hydrocarbons.

8. Process according to claim 6 wherein said vegetable comprises soya beans.

References Cited
FOREIGN PATENTS

| | | | |
|---|---|---|---|
| 3,352,765 | 11/1967 | Warner et al. | 203—70 |
| 3,457,166 | 7/1969 | Haufe et al. | 208—301 |

FOREIGN PATENTS

| | | | |
|---|---|---|---|
| 125,738 | 5/1944 | Australia | 260—412.8 |

LEWIS GOTTS, Primary Examiner

E. G. LOVE, Assistant Examiner

U.S. Cl. X.R.

208—301; 260—666, 677, 681.5